United States Patent
Thebault

(10) Patent No.: US 11,702,042 B2
(45) Date of Patent: Jul. 18, 2023

(54) DEVICE FOR DE-ICING AND/OR CLEANING A VEHICLE WINDOW USING A CONTINUOUS-ROTATION MOTOR, AND CORRESPONDING CONTINUOUS-ROTATION MOTOR AND METHOD

(71) Applicant: Valeo Systèmes d'Essuyage, Le Mesnil Saint Denis (FR)

(72) Inventor: Denis Thebault, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 565 days.

(21) Appl. No.: 16/091,839

(22) PCT Filed: Mar. 28, 2017

(86) PCT No.: PCT/EP2017/057345
§ 371 (c)(1),
(2) Date: Oct. 5, 2018

(87) PCT Pub. No.: WO2017/174407
PCT Pub. Date: Oct. 12, 2017

(65) Prior Publication Data
US 2019/0084527 A1  Mar. 21, 2019

(30) Foreign Application Priority Data

Apr. 8, 2016 (FR) ...................................... 1653088

(51) Int. Cl.
*B60S 1/48* (2006.01)
*B60S 1/52* (2006.01)

(52) U.S. Cl.
CPC ............... *B60S 1/482* (2013.01); *B60S 1/524* (2013.01)

(58) Field of Classification Search
CPC ...... B60S 1/48; B60S 1/50; B60S 1/52; B60S 1/482; B60S 1/524; B60S 1/483;
(Continued)

(56) References Cited

U.S. PATENT DOCUMENTS 2,905,962 A * 9/1959 Ziegler .................. B60S 1/483
15/250.02
2,914,256 A * 11/1959 O'Shei ...................... B60S 1/48
239/548
(Continued)

FOREIGN PATENT DOCUMENTS

| CN | 103434488 A | 12/2013 |
| CN | 104512382 A | 4/2015 |

(Continued)

OTHER PUBLICATIONS

International Search Report issued in PCT/EP2017/057345 dated Jun. 26, 2017 (2 pages).
(Continued)

*Primary Examiner* — Gary K. Graham
(74) *Attorney, Agent, or Firm* — Osha Bergman Watanabe & Burton LLP

(57) ABSTRACT

The invention relates to a device (1) for de-icing and/or cleaning insects off a vehicle window (10) which is designed to perform at least a window wiping function and comprising a continuous-rotation motor (40) designed to drive the rotation of at least one wiper (30) to at least a first level corresponding to a first wiping speed, referred to as high wiping speed (HWS), and a second level at a second wiping speed, referred to as low wiping speed (LWS) and lower than the first, so as to perform the wiping function, and a system for spraying a specific, de-icing or insect-cleaning liquid, onto the window (10) from the said at least one wiper (30), characterized in that the continuous-rotation motor is designed in such a way as to operate at a third speed (CS),
(Continued)

lower than the second speed, and in that the device is configured to cause the said wiper (30) to at least descend from the high position (PH) as far as the low position (PB) with the motor (40) operating at the very slow speed (CS) and with the said spraying system activated over at least part of the said descent. The invention also relates to the continuous-rotation motor suited to the device and to a cleaning method using the device.

8 Claims, 3 Drawing Sheets

(58) Field of Classification Search
CPC ...... B60S 1/0807; B60S 1/0803; B60S 1/481; B60S 1/522
USPC .............................. 15/250.04, 250.01, 250.02
See application file for complete search history.

(56) References Cited

U.S. PATENT DOCUMENTS

| | | | | |
|---|---|---|---|---|
| 3,737,750 | A * | 6/1973 | Kearns | B60S 1/483 |
| | | | | 318/443 |
| 6,402,052 | B1 * | 6/2002 | Murawa | B05B 1/3006 |
| | | | | 239/533.1 |
| 8,366,021 | B2 * | 2/2013 | Trager | B60S 1/50 |
| | | | | 239/284.1 |
| 2003/0066907 | A1 * | 4/2003 | Drouillard | B60S 1/522 |
| | | | | 239/284.1 |
| 2007/0284457 | A1 * | 12/2007 | Shank | B05B 9/002 |
| | | | | 239/135 |
| 2008/0060677 | A1 | 3/2008 | Nakano | |
| 2015/0113753 | A1 * | 4/2015 | Barnwell-Williams | |
| | | | | B60S 1/524 |
| | | | | 15/250.04 |

FOREIGN PATENT DOCUMENTS

| | | | |
|---|---|---|---|
| CN | 204937083 | U | 1/2016 |
| CN | 105346514 | A | 2/2016 |
| CN | 105459964 | A | 4/2016 |
| FR | 2 789 034 | A1 | 8/2000 |
| JP | 2016068753 | A | 5/2016 |
| WO | 98/58826 | A1 | 12/1998 |
| WO | 2014/198892 | A1 | 12/2014 |

OTHER PUBLICATIONS

Written Opinion of the International Searching Authority issued in PCT/EP2017/057345 dated Jun. 26, 2017 (7 pages).
The First Office Action issued in corresponding Chinese Patent Application No. 201780028587.9, dated Mar. 3, 2021 (18 pages).
Guo Zhongxing et al.; "Modern Automobile Motor Technology;" Shanghai Science and Technology Press; Jan. 31, 2015; pp. 67-68 (6 pages).
The Second Office Action issued in Chinese Application No. 201780028587.9, dated Nov. 22, 2021 (20 pages).
Song Yangjian et al.; "Automotive Electrical Equipment Project Tutorial" China Ocean University Press; Aug. 2015; pp. 208-210 (6 pages).
Third Office Action in corresponding Chinese Application No. 201780028587.9, dated May 20, 2022 (27 pages).

* cited by examiner

DEVICE FOR DE-ICING AND/OR CLEANING A VEHICLE WINDOW USING A CONTINUOUS-ROTATION MOTOR, AND CORRESPONDING CONTINUOUS-ROTATION MOTOR AND METHOD

TECHNICAL FIELD

The technical field of the present invention is that of the devices for de-icing and/or cleaning a window of a vehicle, in particular a motor vehicle, using wipers and liquid spraying means.

STATE OF THE ART

Motor vehicles are commonly equipped with window wiping and washing systems to ensure wiping and washing of the windows and thus avoid having the view of the driver disrupted. Such an installation generally comprises two wipers which scrape the outer surface of the window, such as the windshield, so as to dispel the water present on this surface. Spray nozzles are positioned on the hood of the vehicle or on the wipers, in a more recent version, and are supplied with windscreen-washing liquid via a pump and a system of pipelines linked to a tank of windscreen-washing liquid.

Some motor vehicles are equipped with de-icing systems. A de-icing system generally comprises a conventional wiping and washing system of the abovementioned type, with which can be associated, in addition, a tank of de-icing liquid and even an additional pump. In order to de-ice a window in cold weather, the spray nozzles are supplied with de-icing liquid via the pump and the system of pipelines linked to the tank of de-icing liquid.

The Applicant has already proposed de-icing systems and devices, described in particular in the document FR-A1-2 789 034, which use electronically-controlled motors, for example operating in stepper mode, capable of performing a sweep of the windshield by successive angular segments, with stops and with the sweep speed modulated.

With the use of this technology, it is possible to define de-icing programs in which, in particular, the climb of the wipers over the window is performed in a series of successive angular steps with the spraying of de-icing liquid, allowing the de-icing liquid the time to act to ensure an excellent recovery of visibility for outside temperatures dropping at least to −20° C.

The same device can also be used, by adapting the parameters of the program and with an appropriate liquid, to clean a windshield on which mosquitoes are stuck. In this case, indeed, the liquid acts in a similar way to dissolve and/or unstick the soiling due to the mosquitoes crushed on the windshield, to then allow them to be dispelled by wiping.

The efficiency of the de-icing or insect cleaning program relies here in particular on the possibility of stopping the motor of the windscreen wipers, or at least finely controlling the speed thereof, to cause specific, de-icing or insect cleaning liquid to act. These motors and their control devices are however relatively expensive and the installation thereof is not provided on range entry-level vehicle models.

There is therefore a need to obtain equivalent results with devices using a continuous-rotation motor, not electronically controlled, for range entry-level vehicles.

The invention provides a solution to this need, which is simple, effective and economical.

SUMMARY OF THE INVENTION

To this end, the invention proposes a device for de-icing and/or cleaning insects from a vehicle window arranged to perform at least one window wiping function and comprising:

a. at least one wiper capable of being displaced over said window between a low position and a high position,
b. a continuous-rotation motor arranged to rotationally drive said at least one wiper according to at least one first level corresponding to a first, so-called high wiping speed, and a second level corresponding to a second, so-called low wiping speed and lower than the first, so as to perform the sweep function,
c. a system for spraying a specific liquid, for de-icing or cleaning insects, over the window, characterized in that the continuous-rotation motor is arranged so as to operate at a third, so-called very slow speed, lower than the second speed, and in that the device is configured to cause said wiper to perform at least descent from the high position to the low position and/or at least one climb from the low position to the high position with the motor operating at the third speed and with said spraying system activated over at least a part of said descent and/or climb.

The third, very slow speed, makes it possible to perform a sweep of the window with a speed allowing the wiper to remain long enough in proximity to the zones that it crosses on the window for the active liquid to be able to act.

Preferentially, the third speed takes a value lying substantially between fifteen and twenty five cycles per minute.

Even more preferentially, the third speed takes a value lower than or equal to twenty cycles per minute, preferably equal to fifteen cycles per minute.

Preferably, the liquid spraying system is arranged to spray said liquid onto the window substantially along said at least one wiper.

Advantageously, the liquid spraying system comprises orifices for spraying said liquid onto the window borne by said at least one wiper or an element being displaced with said wiper. The displacement of the wiper is thus exploited to spray the liquid over all the surface of the window swept by the wiper.

Advantageously, the specific liquid spraying system comprises:

a. at least one tank containing a specific liquid, for de-icing or cleaning insects,
b. a system of pipelines linking said at least one tank to the orifices,
c. a pump intended to make said liquid circulate in the system of pipelines to its ejection through said orifices.

The device can further be arranged to spray a second, non-specific liquid when said at least one wiper is driven by said continuous-rotation motor operating at the first wiping speed or the second wiping speed, so as to perform a washing function.

The device can comprise an electronic control unit arranged to control the motor and the specific liquid spraying system.

The invention relates also to a continuous-rotation motor for a device for wiping and cleaning a vehicle window, said device comprising at least one wiper capable of being displaced over said window between a low position and a high position, said motor being intended to drive said wiper of said device by the rotation of a rotor at a given speed, said rotor being equipped with switching means, intended to power conductive turns of the rotor from a direct current source setting a determined potential, said switching means being arranged to make said motor operate according to a finite number of determined speed levels, said motor being configured for said speed levels to comprise at least one first level corresponding to a first, so-called high wiping speed, and a second level corresponding to a second, so-called low wiping speed and lower than the first, characterized in that said levels comprise at least one third level corresponding to a third speed, lower than the second speed.

Preferentially, said motor is configured in such a way that the third speed takes a value lying substantially between fifteen and twenty five cycles per minute, and, even more preferentially, in such a way that the third speed takes a value lower than or equal to twenty cycles per minute. Preferably, the third speed is also fifteen cycles per minute. Advantageously, it is configured in such a way that the second speed takes a value at least equal to thirty cycles per minute.

According to a preferred embodiment of said motor, said switching means comprise a commutator linked to the conductive turns of the rotor and connecting brushes intended to be linked to said direct current source and whose function is to transmit a current to the commutator, a first and a second connecting brush being diametrically opposite and the motor being arranged to operate at the third speed when said first and second connecting brushes are connected respectively to a first terminal and a second terminal of said direct current source.

Preferably, the continuous-rotation motor comprises a third connecting brush and a fourth connecting brush intended to be connected to the second terminal of the direct current source, the third connecting brush and the fourth connecting brush being offset in succession toward the first connecting brush relative to the second connecting brush, following the circumference of the commutator.

The invention relates also to a method for de-icing a vehicle window, said vehicle being equipped with a de-icing device as described previously, comprising a step 2) during which said wiper performs at least one descent from the high position to the low position with the motor operating at the third speed and with the system for spraying a specific liquid activated over at least a part of said descent, so as to spread the specific liquid over the window between the high position and the low position or a step 2') during which said wiper performs at least one climb from the low position to the high position with the motor operating at the third speed and with the system for spraying a specific liquid activated over at least a part of said climb, so as to spread the specific liquid over the window between the low position and the high position.

Preferably, the method comprises, during step 2), a climb of the wiper from the low position to the high position is performed before the descent, with the motor operating at the third speed and with the system for spraying a specific liquid deactivated from the low position to at least a position close to the high position.

Preferably, the step 2) is preceded by a step 1) during which the motor is stopped and it comprises a specific liquid spraying phase followed by a pause phase of given duration, so as to dissolve any matter sticking said wiper to the window.

DESCRIPTION OF THE FIGURES

Other features and advantages of the invention will emerge on reading the following description and about exemplary embodiments given by way of illustration with reference to the attached figures. In these figures.

DETAILED DESCRIPTION

Figure 1:
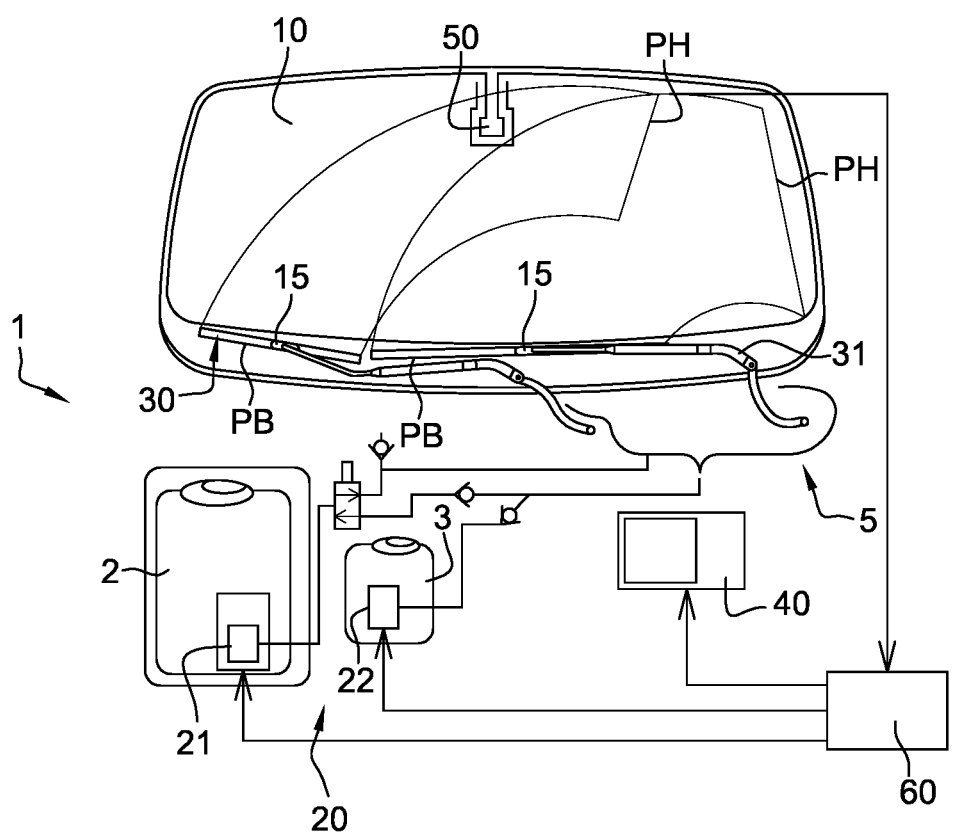
FIG. 1 is a schematic view of a device for washing and de-icing a window, here of a motor vehicle.

The invention relates to a de-icing device 1 applied to a window, such as a windshield 10 of a motor vehicle, as is illustrated in FIG. 1. Preferably, the device 1 is arranged to be able to also clean insects stuck to the windshield 10, as will be described hereinbelow.

Such a device generally comprises a first tank 2 and at least one second tank 3.

The first tank 2 contains a washing liquid used to have the device execute a standard washing function when the view through the windshield 10 is hampered by soiling that is easy to clean.

The second tank 3 contains, for example, a de-icing liquid for having the device execute a de-icing function. The second tank 3 can take the form of a tank fixed to the vehicle provided with a filling neck. Advantageously, the second tank 3 takes the form of a removable cartridge. It is thus possible, for example by changing the cartridge, to replace the de-icing liquid with a liquid comprising a specific detergent suitable for cleaning away insects. Whether the second tank 3 is fixed or takes the form of a removable cartridge, the second tank 3 contains a specific liquid, generally more costly than the washing liquid of the first tank 2 and intended to be used less often.

The washing device 1 also comprises a system of pipelines 3 linking the first tank 2 and the second tank 3 to orifices 15, that can be formed by spray nozzles, through which the washing liquid and/or the specific liquid are ejected onto the windshield 10.

It also comprises a pump system 20 intended to make the washing liquid and/or the specific liquid circulate in the system of pipelines 5 until it or they are ejected through the orifices 15. The pump system 20 here comprises two independent pumps 21, 22. A first pump 21 is associated with the first tank 2 and is intended to make washing liquid circulate in the system of pipelines 5 and a second pump 22 is associated with the second tank 3 and is intended to make specific liquid circulate in the system of pipelines 5.

The first 21 and the second 22 pumps are, for example, moved by direct-current motors and are arranged to be able to operate at at least one given power level for chosen durations, in order to circulate a liquid flow rate suited to the operating cycles of the device 1, as will be described hereinbelow.

The de-icing device 1 comprises at least one wiper 30 mounted on an arm 31 and capable of being displaced over the windshield 10 between a low position PB and a high position PH, and vice versa. In the example represented, the device 1 comprises two wipers 30.

According to a first variant, the spray nozzles can be situated along the wipers 30 only facing the extreme high wiping position PH. In this case, the spraying of liquid can be performed only in the direction of climb from the low position to the high position PH, only in the direction of descent from the high position PH to the low position PB, or both in the direction of climb and in the direction of descent.

According to a second variant, the system can be implemented with spray nozzles situated on both longitudinal sides of the wipers. As described above, the spraying of liquid can be performed then either only in the direction of climb from the low position PB to the high position PH, or only in the direction of descent from the high position PH to the low position PB, or in both directions, that is to say in the direction of climb and in the direction of descent. The spraying of liquid is performed then using spray nozzles arranged facing the side of advance or away from the side of advance depending on the effect sought.

So as to exploit the displacement of the wipers 30 to spray liquid substantially over all the surface of the windshield 10 that they sweep, the spray nozzles 15 can be distributed over the length of each wiper 30. In a variant, it is possible to install one or more spray nozzles on the arm 31, for example arranged to spray the liquid all along the wiper 30 from a central position or to spray the liquid directly onto the windshield.

The device 1 also comprises a motor 40 intended to drive the wipers 30 between their respective low positions PB and high positions PH. The motor 40 is, here, a continuous-rotation motor. As is known, by turning at a substantially constant speed $\Omega$, it drives, through a system of connecting rods that is not represented, the wipers 30 in a reciprocating movement between their low position PB and their high position PH. Generally, over one turn of the motor 40, each wiper 30 describes a cycle away from and back to the low position PB. The speed $\Omega$ of the motor 40 is thus generally characterized as a number of cycles per minute (cpm).

It is recalled here that the device 1 which is described, particularly in the case of a windshield 10, must fulfil a first function which is to wipe the windshield 10 in front of the driver in case of rain to ensure that he or she has a good visibility. It is therefore a piece of equipment that affects driving safety. The device 1 must therefore respect certain criteria in order to ensure this safety. Regarding the wipers 30, the sweep speed $\Omega$ is one of these criteria. In particular, according to a European standard (CE118318) concerning windshield wiping devices, the continuous-rotation motor 40 must allow the sweeping at two speeds, a high wiping speed (HWS) and a low wiping speed (LWS). These two speeds must lie within determined ranges of values and be separated by at least 15 cpm (fifteen cycles per minute). Typically, for the example considered, the motor 40 is designed to turn at a high speed HWS whose value is $\Omega 1=60$ cpm, and at a low speed LWS whose value is $\Omega 2=40$ cpm.

Figure 2:
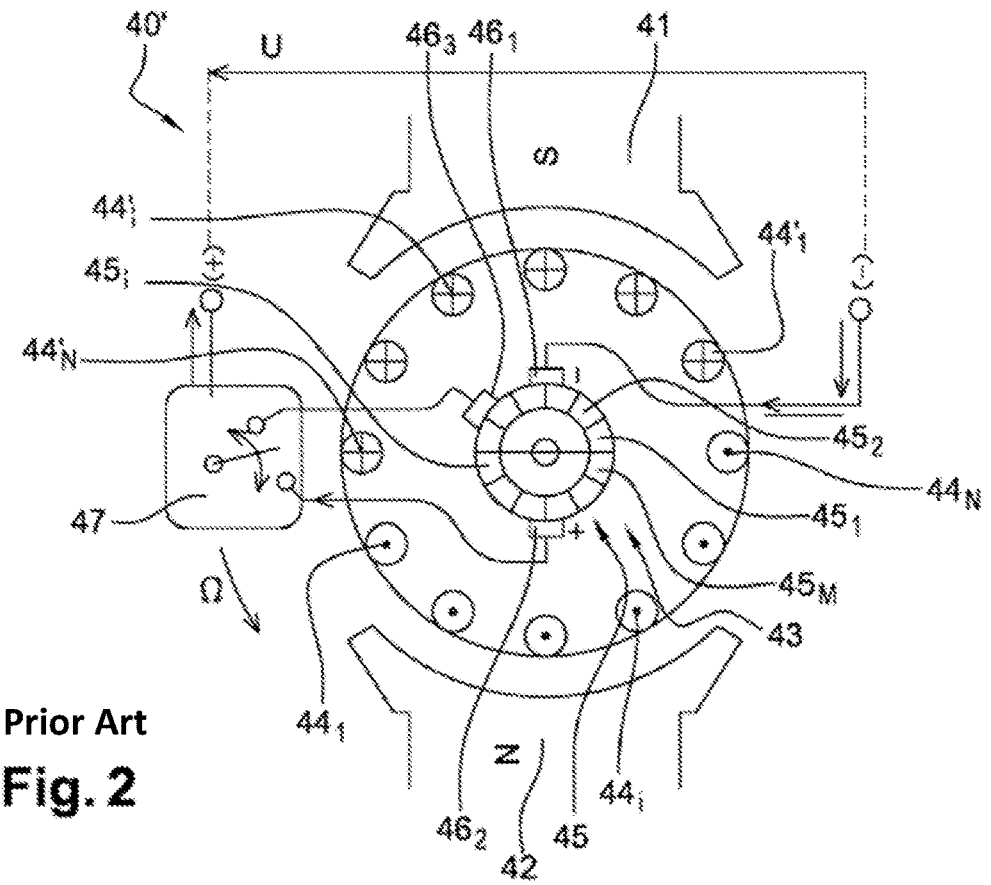
FIG. 2 presents a schematic front view of a continuous-rotation motor according to the prior art.

Referring to FIG. 2, a continuous-rotation motor 40' according to the state of the art, as used to drive wipers 30 at low wiping speeds LWS and high wiping speeds HWS, advantageously comprises a stator inductor of a magnetic field, formed for example by a permanent magnet 41-42, and a rotor 43 comprising, in the example, two times N conductors $44_1$-$44_N$, $44'_1$-$44'_N$ substantially parallel to the axis of the rotor 43 and distributed over its circumference. The rotor 43 also comprises a commutator 45, supporting a ring of M platelets $45_1$-$45_M$ insulated from one another. Conductive wires, not represented, connect the conductors $44_1$-$44_N$, $44'_1$-$44'_N$, directly to one another at one of their ends and to the platelets $45_1$-$45_M$ at their other ends, so as to form conductive turns $44_i$-$44'_i$, between a first series of conductors $44_1$-$44_n$ and a second series of conductors $44'_1$-$44'_n$.

Here, the motor 40' is connected to the two terminals of a current source ensuring a potential difference U, via a circuit comprising three connecting brushes. A first connecting brush $46_1$ is connected to a first potential terminal and is positioned in such a way as to rub against the platelets $45_i$ when the rotor 43 turns to ensure the contact with each, one by one. A second connecting brush $46_2$ and a third $46_3$ are also positioned against the circumference of the commutator 45, so as to rub against the platelets $45_i$. The second connecting brush $46_2$ is placed diametrically opposite the first brush $46_1$, the third $46_3$ is placed so as to be offset over the circumference of the commutator 45, between the first $46_1$ and the second $46_2$ connecting wiper. The second $46_2$ and third $46_3$ connecting wipers are, here, linked to the second potential terminal by a switch 47 which makes it possible to connect one or other of them.

The electrical circuit between the conductors $44_i$ and the platelets $45_i$ of the rotor 43 is generally configured such that the electrical current I passes into all the conductive turns $44_i$-$44'_i$ of the rotor 43 when the second connecting brush $46_2$ is connected to the second potential terminal. It is the switching of the connections of the first $46_1$ and second $46_2$ connecting brushes with the platelets $45i$ which pass in front of them which causes the current I to always run in the same direction in the conductors $44_1$-$44_N$, $44'_1$-$44'_N$ when they are located at a given position relative to the magnetic field: in FIG. 2, toward the front for the conductors $44_1$-$44_N$, located in in the lower half of the motor 40 and toward the rear for the conductors $44'_1$-$44'_N$, located in the upper half. The interaction between the current I flowing in the conductors $44_1$-$44_N$, $44'_1$-$44'_N$ and the magnetic field induced by the stator 41-42 creates the torque which rotates the rotor 43 at the speed $\Omega$.

The size of the windings of the conductors $44_i$-$44'_i$, in particular, is then adapted for the motor to turn at the value $\Omega 2$ of the slow wiper speed LWS taking into account the magnetic field induced by the stator 41-42.

Moreover, the configuration of the electrical circuit involving the conductors $44_1$-$44_N$, $44'_1$-$44'_N$ and the platelets $45_1$-$45_M$, like the position of the third connecting brush $46_3$, is arranged so that, when it is the third connecting brush $46_3$ which is connected to the second potential terminal, the current I does not flow in a certain number of conductive turns $44_i$-$44'_i$ formed by the conductors of the rotor 43. In this case, for a same potential difference U applied to the terminals, the motor 40' turns at the high wiping speed HWS of value $\Omega 1$, with a higher intensity of the current I.

Figure 3:
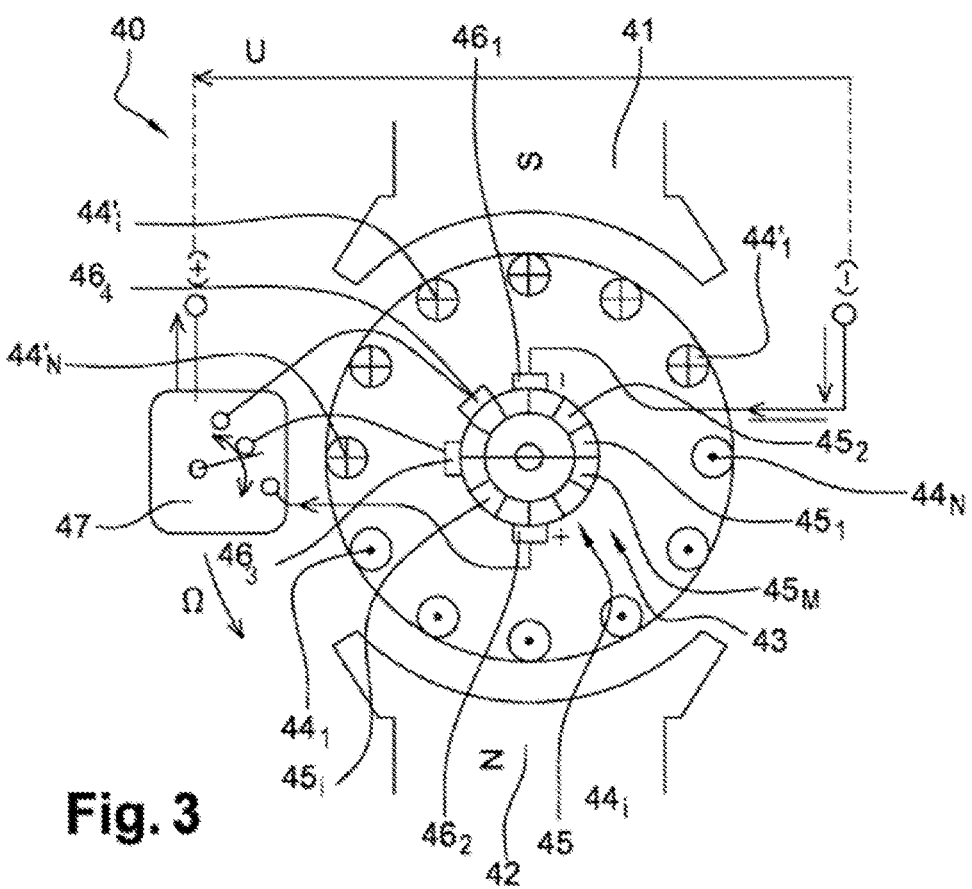
FIG. 3 presents a schematic front view of a continuous-rotation motor according to the invention that can be used in a device of FIG. 1.

By comparison, the motor 40 according to the invention, represented in FIG. 3, is designed to be able to operate at the value $\Omega 2$ of the low wiping speed LWS and at the value $\Omega 1$ of the high wiping speed HWS, and, in addition, at a third, very slow speed (here called CS, for cleaning speed), whose value $\Omega 3$ is significantly lower than the value $\Omega 2$ of the low wiping speed LWS. Typically, this very slow speed CS has a value $\Omega 3$ lying within a range [15 cpm; 25 cpm], preferably equal to 15 cpm. As will be seen later in the description of a de-icing and/or cleaning cycle, this very low speed CS is necessary to allow time for the specific liquid to be deposited when it is ejected through the orifices 15 arranged on the wiper 30. Furthermore, it has become apparent that the range of values within which the low wiping speed LWS must be located is too high to ensure this function.

Referring to FIG. 3, where the same numbers as those of FIG. 2 are taken up for the elements having the same functions, a motor 40 according to the invention comprises a fourth connecting brush $46_4$. The second connecting brush $46_2$ is still here diametrically opposite the first $46_1$, the third $46_3$ and fourth $46_4$ connecting brushes being offset relative to the second $46_2$ over the circumference of the commutator 45.

Thus, the first connecting brush $46_1$ and the second connecting brush $46_2$ are diametrically opposite. The third connecting brush $46_3$ and the fourth connecting brush $46_4$ extend over the same half-circle between the first connecting brush $46_1$ and the second connecting brush $46_2$. The fourth connecting brush $46_4$ extends between the third connecting brush $46_3$ and the first connecting brush $46_1$.

Here, the motor 40 is designed in such a way as to turn the value Ω3 of the very low speed CS when the second connecting brush $46_2$ is connected to the second potential terminal. Compared to the motor 40', to switch from a speed of 40 cpm to 20 cpm for example, it is then necessary to either double the number of conductive turns $44_i$-$44'_i$ formed by the conductors of the rotor 43, or to double the value of the magnetic field induced by the stator 41-42.

Next, the third connecting brush $46_3$ is offset so as to short-circuit a sufficient number of conductive turns $44_i$-$44'_i$ for the speed of rotation of the rotor 43 to take the value Ω2 of the low wiping speed LWS. The fourth connecting brush $46_4$ is a little bit more offset over the circumference of the commutator 45 toward the first connecting brush $46_1$ to further reduce the number of conductive turns $44_i$-$44'_i$ passed through by the current I and obtain the value Ω1 of the high wiping speed HWS for the rotor 43.

Moreover, the switch 47 here makes it possible to connect one or other of the second $46_2$, third $46_3$ and fourth $46_4$ connecting brushes to the second potential terminal. It therefore comprises three positions each corresponding to one of the values Ω1, Ω2, Ω3 of the speed of rotation of the motor 40, plus a neutral position, in which no current passes and the motor 40 is stopped. In this example, the motor 40 is controlled simply by setting the switch to a given position for a given time period.

Generally, the device 1 further comprises an electronic unit 60 capable of controlling the motor 40 driving the wipers 30 and activating the pump system 20, the pumps 21, 22 being able to be controlled independently. Here, the electronic unit 60 sends mainly switching commands to the motor 40 and to the pumps 21, 22, according to determined sequences to have the desired cycles performed.

The device 1 can further comprise a vehicle outdoor temperature sensor 50. It is situated here on a high part of the windshield 10, at the center thereof, without this position being limiting. The sensor 50 can be directly exposed to the ambient air outside the vehicle and is intended to measure the outside temperature, for example within a range of values ranging from −50° C. to +50° C. Its information can be used by the control unit to adapt the parameters of the cycles performed.

There now follows a description of an example of how the device 1 can operate with the continuous-rotation motor 40 to perform the de-icing function.

The de-icing function is performed normally when the vehicle is stopped. Indeed, it involves removing ice preventing the driver from seeing through the windshield, and therefore from driving the vehicle. The driver can request the launching of this function through controls installed in the vehicle or remotely, for example by sending a message through his or her cellphone to a telecommunication module linked to the device 1.

The de-icing cycle can begin with a first step, comprising a phase of spraying of the de-icing liquid while keeping the wipers 30 in the position where they are, the control unit 60 actuating the second pump 21 without actuating the motor 40.

A waiting phase, generally of a few seconds, follows the spraying phase to allow time for the de-icing liquid to melt the ice and free the wipers 30 which may be stuck to the windshield 10 by the ice.

Generally, the wipers are in the low position PB when wanting to start the cycle. They are therefore ready to start the second step.

Figure 4A:
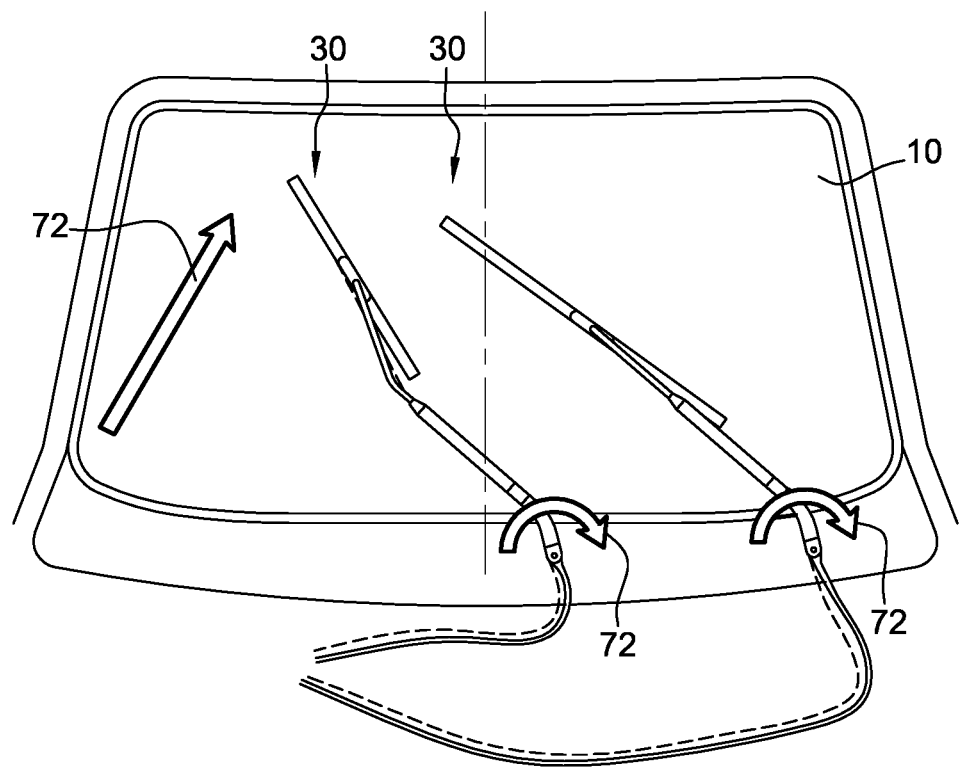
FIGS. 4a and 4b are schematic views showing a window de-icing cycle according to the invention.
Figure 4B:
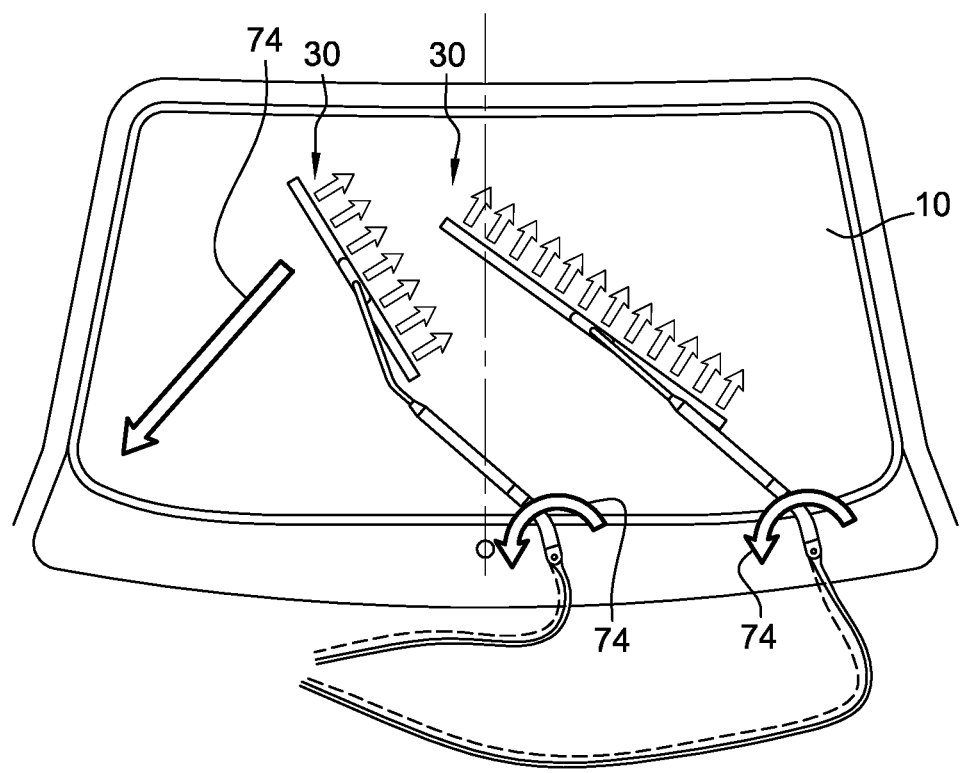

Referring to FIGS. 4a and 4b, the second step comprises a phase of climbing from the low position PB to the high position PH, represented by the reference 72, without spraying of de-icing liquid and a phase of descent, represented by the reference 74, returning to the low position PB, with spraying of the de-icing liquid.

The climb and the descent are performed by using the very low speed CS of the continuous-rotation motor 40. During the descent, the spraying of specific liquid is performed away from the side of advance of the wipers 30, that is to say toward the high position PH.

To perform this second step, the control unit 60 places the switch 47 in position to connect the second connecting brush $46_2$ then reposition the switch 47 in neutral position after a time delay corresponding to a reciprocating cycle at the very low speed Ω3. In parallel, another time delay of the control unit waits roughly for a half-cycle before starting up the second pump 22, so as to cause the spraying of the de-icing liquid to coincide with the phase of descent of the wipers 30.

As described previously, the very low speed CS allows a continuous and uniform spreading of the de-icing liquid over the surface swept by the wipers 30. The range of values Ω3 of this very low speed, between 15 and 20 cpm, appears as an interesting compromise between not going too fast for the liquid to be spread and keeping an acceptable duration for the de-icing cycle. The de-icing liquid can thus be distributed correctly over the windshield 10 and begin to act on the ice.

Generally, the cycle comprises at least one pause step, when the wipers 30 have returned to their low position PB. The duration of this pause step is determined to allow the de-icing liquid time to melt the ice.

At the end of this pause step, the driver can, if necessary, initiate cycles of the wiping function to clear the windshield of the liquid water present on the windshield.

Alternatively, the control unit 60 can be configured to automatically initiate a rinsing cycle using the pump 21 at the low wiping speed (LWS).

In the case of the cleaning of insects, the cycle followed by the device 1 can be the same as for de-icing. The difference lies in the specific liquid, suited to the cleaning of insects, which is present in the second tank 3. The selection between the de-icing function and the insect cleaning function will therefore be able to be done according to the season, for example by changing the cartridge of the second tank 3. In a variant, some parameters, such as the durations of the waiting or pause phases of the cycle, can be adapted to the action of the insect cleaning liquid.

The invention claimed is:

1. A device for de-icing and/or cleaning insects from a vehicle window arranged to perform at least one window wiping function and comprising:
   at least one wiper capable of being displaced over said window between a low position and a high position;
   a continuous-rotation motor arranged to rotationally drive said at least one wiper according to at least one first level corresponding to a first speed, and a second level corresponding to a second speed that is lower than the first speed, so as to perform sweep function; and a system for spraying a specific liquid, for de-icing or for cleaning insects, onto the window, wherein the continuous-rotation motor is arranged so as to operate at a third speed lower than the second speed, and wherein the device is configured to cause said wiper to perform slow sweeps with the continuous-rotation motor operating at the third speed, the slow sweeps comprising at least one descent from the high position to the low position and/or at least one climb from the low position to the high position, wherein said spraying system sprays the specific liquid over the window during at least a part of a spraying sweep and stops spraying throughout a non-spraying sweep, the spraying sweep and the non-spraying sweep are two consecutive slow sweeps and in opposite directions, the spraying sweep corresponding to said descent or climb with the continuous-rotation motor operating at the third speed, and wherein said spraying system comprises two independent pumps moved by direct-current motors, including one pump that circulates the specific liquid in a system of pipelines to ejection of the specific liquid through orifices.

2. The device as claimed in claim 1, in which the third speed takes a value lying between fifteen and twenty five cycles per minute.

3. The device as claimed in claim 2, in which the third speed takes a value equal to fifteen cycles per minute.

4. The device as claimed in claim 1, in which the liquid spraying system is arranged to spray said liquid onto the window substantially along said at least one wiper.

5. The device as claimed in claim 4, in which the liquid spraying system comprises the orifices for spraying said liquid onto the window borne by said at least one wiper or an element being displaced with said wiper.

6. The device as claimed in claim 5, in which the specific liquid spraying system further comprises:

at least one tank containing the specific liquid, for de-icing or cleaning insects, the system of pipelines linking said at least one tank to the orifices.

7. The device as claimed in claim 1, further arranged to spray a second, non-specific liquid when said at least one wiper is driven by said continuous-rotation motor operating at the first wiping speed or the second wiping speed to perform a washing function.

8. The device as claimed in claim 1, further comprising an electronic control unit arranged to control said continuous-rotation motor and said specific liquid spraying system.

* * * * *